Patented Sept. 18, 1945

2,384,876

UNITED STATES PATENT OFFICE 2,384,876

THERMOPLASTIC PRODUCTS DERIVED FROM RUBBERS

Thomas W. Bartram, Nitro, W. Va., assignor to Monsanto Chemical Company, St. Louis, Mo., a corporation of Delaware No Drawing. Application June 11, 1942, Serial No. 446,608

18 Claims. (Cl. 260—768)

This invention relates to new thermoplastic products derived from rubbers and to the preparation of the same.

In accordance with this invention a rubber is treated with an organic sulfophosphine halide. While useful products have been obtained by treating rubbers with organic phosphine halides, it has now been found that the sulfophosphines behave similarly. Accordingly, the organic sulfophosphines can be substituted directly or with but slight modification in the process and compositions disclosed in co-pending applications of George D. Martin, Serial Nos. 346,991, filed July 23, 1940; 364,598, filed November 6, 1940; 416,587, filed October 25, 1941, and 416,588, filed October 25, 1941, and in co-pending application of David J. Beaver, Serial No. 417,577, filed November 1, 1941. Furthermore, the rubbery products obtained from a rubber and an aryl sulfophosphine halide in the presence of a suitable modifying agent as hereinafter described may be substituted for the rubber like products obtained from a rubber and an aryl phosphine halide in the compositions disclosed in co-pending application of Paul M. Downey, Serial No. 426,069, filed January 8, 1942.

While the organic constituent in the sulfophosphine halide may be selected from a wide variety of organic radicals, it is preferred to use a product in which a carbon atom of the organic group is linked directly to phosphorus. As typical examples of organic sulfophosphine halides which may be used to prepare the new products mention is made of the following but the invention is by no means limited thereto: phosphenyl sulfochloride, thiophen sulfodichlor phosphine, tolyl sulfodichlor phosphine, 1,3,4 trimethylphenyl sulfodichlor phosphine, 1,3,5 trimethylphenyl sulfodichlor phosphine, xylyl sulfodichlor phosphine, biphenyl sulfodichlor phosphine, alpha naphthyl sulfodichlor phosphine, tetrahydronaphthyl sulfodichlor phosphine, meta diphenyl phenyl sulfodichlor phosphine, decyl phenyl sulfodichlor phosphine, diethyl amino phenyl sulfodichlor phosphine, dimethyl amino phenyl sulfodichlor phosphine, tertiary butyl phenyl sulfodichlor phosphine, ditolyl sulfochlor phosphine, dixylyl sulfochlor phosphine, tolyl sulfodibrom phosphine, alpha naphthyl sulfodibrom phosphine, benzyl sulfodichlor phosphine, anisyl sulfodichlor phosphine, phenetyl sulfodichlor phosphine, meta and para hydroxy phenyl sulfodichlor phosphine, chlorphenyl sulfodichlor phosphine, bromphenyl sulfodichlor phosphine, ethyl phenyl sulfodichlor phosphine, dibenzyl sulfodichlor phosphine, diphenyl methyl sulfodichlor phosphine, xylyl sulfodifluor phosphine, naphthyl sulfodifluor phosphine, ditertiary butyl phenyl sulfomonochlor phosphine, decyl sulfodichlor phosphine, heptyl sulfodichlor phosphine, heptyl sulfodifluor phosphine, decyl sulfodifluor phosphine, tolyl sulfodiiodo phosphine, tolyl sulfodifluor phosphine, amyl sulfodichlor phosphine, hexyl sulfodichlor phosphine, butyl sulfodichlor phosphine, amyl sulfodibrom phosphine, diamyl sulfochlor phosphine, cymyl sulfodichlor phosphine, dicymyl sulfochlor phosphine, retyl sulfodichlor phosphine, retyl sulfodibrom phosphine, ethyl sulfodichlor phosphine and equivalents and analogues thereof.

A convenient method of preparing the sulfo phosphine halides of this invention is to react the organic phosphine halide with sulfur although other methods may be used as for example the reaction of $PSCl_3$ with a suitable hydrocarbon. However, the invention is not limited to the method of preparation. The aryl phosphine halides are usually made by reacting a suitable aryl hydrocarbon with a phosphorus trihalide in the presence of anhydrous aluminum chloride (see Liebig's Annalen Vol. 212, p 206, 207). The reaction results in a composition comprising the aryl phosphine halide and aluminum chloride. This crude composition, preferably after the removal of unreacted hydrocarbon and phosphorus trihalide, combines readily with sulfur to produce a crude reaction mixture suitable for reacting directly with rubber. After heating liquid hydrocarbons as for example xylene, toluene or petroleum ether with a phosphorus trihalide in the presence of anhydrous aluminum chloride, there separates after completion of the reaction, a top layer which consists essentially of unreacted hydrocarbon and phosphorus trihalide and a small amount of the reaction product. The top layer is simply drawn off and reserved for future use. By increasing the proportion of catalyst the reaction can be brought nearer to completion so that eventually no layers separate. In either case the crude product still contains some unreacted ingredients and may be heated up to strip out these constituents.

The following example illustrates in detail the preparation of a crude organic sulfophosphine halide but is not limitative of the invention.

Substantially 255 parts by weight of stripped tolyl dichlor phosphine lower layer and 32 parts by weight of sulfur were charged into a glass or glass lined container of suitable capacity fitted with a stirrer and reflux condenser. The air in the container was displaced by a stream of nitrogen and the mixture heated for about three hours at 130° C. The product comprising the desired tolyl sulfodichlor phosphine was reacted with rubber as described below.

Substantially 100 parts by weight of ground truck peels was heated with dry toluene to swell and soften the rubber and substantially 50 parts by weight of crude tolyl sulfodichlor phosphine dissolved in toluene added thereto with vigorous stirring. The reaction mixture was stirred at 55° to 60° C. for twenty hours and the toluene removed by distillation. Live steam was then introduced and after a thorough steaming out the product was washed with water, preferably on a mill having corrugated rolls or on other equipment adapted for washing tough plastic products. The washed product was dried to constant weight in an oven under vacuum. In this manner substantially 116 parts by weight of a hard resin was obtained.

In general the particular apparatus, the temperature and time of reaction can be widely varied. However, the ingredients must be brought into intimate and uniform association if it is expected to get reproducible results. To this end use of a solvent like benzene, toluene or carbon disulfide is of considerable benefit. However, a solvent may be dispensed with by use of an efficient mixer. This may be of the Werner and Pfleiderer type or modifications thereof but in any case there should be little or no free space above the mixer blades. Use of well broken down rubber further facilitates the reaction. Small amounts of water are usually present in rubber and since the amounts are more or less variable, it is desirable to remove the water before starting the reaction. A Banbury mixer or even an ordinary rubber mill may be used for carrying out the reaction but in the latter case it is necessary, where hard products are sought, to enclose the rolls and displace the moist air by a dry inert gas as for example carbon dioxide. Tight rolls and a small bank both aid the mixing. Once the reactants have been thoroughly mixed so that the mass is homogeneous throughout, the reaction mixture may be removed and heated in an ordinary oven to complete the reaction. While the nature of the reaction taking place is not known, the hydrocarbon content of the rubber is materially increased whereas the amount of halogen combined with the rubber is small.

The addition, during the course of the treatment of the rubber with the thio phosphine halide, of a suitable modifying agent, preferably aromatic polynuclear hydrocarbons, results in products possessing flexibility, elasticity and recovery, and other rubbery properties. Suitable modifying agents include phenanthrene, naphthalene, anthracene, retene, retene oil and rosin oil. In the case of retene a technical grade formed in the distillation of pine wood or rosin is entirely satisfactory and is preferred. A substantial proportion of the polynuclear hydrocarbon is found in the final products.

In a further example of the invention, again not limitative thereof, substantially 100 parts by weight of ground truck peels was heated with dry toluene to swell and soften the rubber and substantially 50 parts by weight of crude tolyl sulfodichlor phosphine dissolved in toluene added thereto with vigorous stirring. The reaction mixture was stirred at 55° to 60° C. for two hours, 80 parts by weight of technical retene added and the heating and stirring continued for eighteen hours. The toluene was then removed by distillation and the residue steamed out, washed, and dried all substantially as described in the foregoing example. 218 parts by weight of a tough rubbery product was obtained. In the presence of an organic accelerator and zinc oxide the product cured nicely with three percent sulfur. The vulcanizate possessed good resistance to attack by ozone and organic solvents as for example gasoline, benzene and mineral oil.

The substitution of 100 parts by weight of whole tire reclaim, pale crepe rubber and Hycar OR (a co-polymer of butadiene and acrylic nitrile) for the ground truck peels in the foregoing treatment with tolyl sulfodichlor phosphine and retene produced rubbery products of 204, 212 and 226 parts by weight respectively. In these preparations pure tolyl sulfodichlor phosphine was used. Tolyl dichlor phosphine was extracted from the crude reaction mixture by means of a suitable solvent, purified by distillation, and reacted with sulfur as described above. The pure tolyl sulfodichlor phosphine was separated by distillation (b. p. 145.5° C. at 8 mm.) and the aforementioned rubbers treated therewith. The products were softer and more tacky than the product from ground truck peels and crude tolyl sulfodichlor phosphine. Somewhat tougher products can be obtained by the addition of anhydrous aluminum chloride to the sulfodichlor phosphine prior to the treatment with rubber.

Ground truck peels was heated with chlorphenyl sulfodichlor phosphine and technical retene to produce a rubbery product. The preparation was carried out substantially as described above substituting 50 parts by weight of chlorphenyl sulfodichlor phosphine (B. P. 125–126° C. at 7 mm.) for the tolyl sulfodichlor phosphine to obtain 194 parts by weight of rubbery product. This product was vulcanized by heating in a press with 4 percent sulfur in the presence of an organic accelerator and zinc oxide, and strips of the vulcanizate were immersed in gasoline and benzene and found to possess good resistance to swelling.

As will be appreciated from the foregoing description and examples a wide variety of rubbers, both natural and synthetic, are applicable in the process of the present invention. Accordingly, the term "a rubber" is employed in the claims to define a vulcanizable plastic material which possesses high extensibility under load coupled with the property of forcibly retracting to approximately its original size and shape after the load is removed. Typical rubbers which can be used in the invention include for example crude india rubber, reclaimed rubber, ground scrap, balata, gutta percha, chlor butadiene polymers (Neoprene), butadiene polymers and copolymers including such well known materials as Perbunan and Hycar OR which are copolymers of butadiene-1,3 and acrylic nitrile and Buna S, a copolymer of btadiene-1,3 and styrene, guayule, juletong or pontionac and polymerized cashew nut oil.

Again this invention is not limited to the specific examples and compositions set forth to illustrate the invention. Other solvents and other organic sulfo phosphine halides can be used as well as other means of effecting the reactions. Again, the new products can be admixed with other plastic or resinous materials. This invention is limited solely by the claims attached hereto as part of the present specification.

What is claimed is:

1. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an organic sulfo phosphine halide having halogen directly linked to the phosphorus atom and heating the mixture.

2. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aromatic sulfo phosphine halide having halogen directly linked to the phosphorus atom and heating the mixture.

3. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine halide having halogen directly linked to the phosphorus atom and heating the mixture.

4. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine chloride having chlorine directly linked to the phosphorus atom and heating the mixture.

5. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine chloride having chlorine directly linked to the phosphorus atom in the presence of retene in an amount exceeding that of the said sulfo phosphine chloride and heating the mixture.

6. A new composition of matter obtained by intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of a crude alkyl phenyl sulfo dichlor phosphine having two chlorine atoms directly linked to the phosphorus atom and containing aluminum chloride and with retene in an amount exceeding that of the said sulfo dichlor phosphine and heating the mixture.

7. A new composition of matter obtained by intimately mixing scrap rubber with substantially 50% by weight of crude tolyl sulfo dichlor phosphine having two chlorine atoms directly linked to a phosphorus atom and containing aluminum chloride and with retene in an amount exceeding that of the said sulfo dichlor phosphine and heating the mixture.

8. A new composition of matter obtained by intimately mixing scrap rubber with substantially 50% by weight of crude chlor phenyl sulfo dichlor phosphine having two chlorine atoms directly linked to a phosphorus atom and containing aluminum chloride and with retene in an amount exceeding that of the said sulfo dichlor phosphine and heating the mixture.

9. A new composition of matter obtained by intimately mixing natural rubber with substantially 50% by weight of an aryl sulfo phosphine chloride having chlorine directly linked to the phosphorus atom and heating the mixture.

10. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an organic sulfo phosphine halide having halogen directly linked to the phosphorus atom and heating the mixture.

11. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aromatic sulfo phosphine halide having halogen directly linked to the phosphorus atom and heating the mixture.

12. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine halide having halogen directly linked to the phosphorus atom and heating the mixture.

13. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine chloride having chlorine directly linked to the phosphorus atom and heating the mixture.

14. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of an aryl sulfo phosphine chloride having chlorine directly linked to the phosphorus atom in the presence of retene in an amount exceeding that of the said sulfo phosphine chloride and heating the mixture.

15. The method of making a new composition of matter which comprises intimately mixing a substance selected from the group consisting of natural rubbers, polymers of butadiene-1,3, copolymers of butadiene-1,3 and acrylonitrile, copolymers of butadiene-1,3 and styrene, chlor butadiene-1,3 polymers, scrap rubber and reclaimed rubber with substantially 50% by weight of a crude alkyl phenyl sulfo dichlor phosphine having two chlorine atoms directly linked to the phosphorus atom and containing aluminum chloride and with retene in an amount exceeding that of the said sulfo dichlor phosphine and heating the mixture.

16. The method of making a new composition of matter which comprises intimately mixing scrap rubber with substantially 50% by weight of crude tolyl sulfo dichlor phosphine having two chlorine atoms directly linked to a phosphorus atom and containing aluminum chloride and with retene in an amount exceeding that of the said sulfo dichlor phosphine and heating the mixture.

17. The method of making a new composition of matter which comprises intimately mixing scrap rubber with substantially 50% by weight of crude chlor phenyl sulfo dichlor phosphine having two chlorine atoms directly linked to a phosphorus atom and containing aluminum chloride and with retene in an amount exceeding that of the said sulfo dichlor phosphine and heating the mixture.

18. The method of making a new composition of matter which comprises intimately mixing natural rubber with substantially 50% by weight of an aryl sulfo phosphine chloride having chlorine directly linked to the phosphorus atom and heating the mixture.

THOMAS W. BARTRAM.